United States Patent
Gray (10) Patent No.: US 7,877,378 B2
(45) Date of Patent: Jan. 25, 2011

(54) SYSTEM AND METHOD FOR CONSOLIDATING EXECUTION INFORMATION RELATIN TO EXECUTION OF INSTRUCTIONS BY A DATABASE MANAGEMENT SYSTEM

(76) Inventor: Jon Gray, Firgrove, East Hoathly, Lewes (GB) BN8 6RA ( * ) Notice: Subject to any disclaimer, the term of this patent is extended or adjusted under 35 U.S.C. 154(b) by 420 days.

(21) Appl. No.: 11/117,281

(22) Filed: Apr. 28, 2005

(65) Prior Publication Data

US 2006/0248080 A1 Nov. 2, 2006

(51) Int. Cl.
*G06F 7/00* (2006.01)
(52) U.S. Cl. .................. 707/718; 707/719; 707/721
(58) Field of Classification Search ............... 707/2, 707/4, 5, 713, 718, 719, 721
See application file for complete search history.

(56) References Cited

U.S. PATENT DOCUMENTS

| | | | |
|---|---|---|---|
| 6,026,391 A * | 2/2000 | Osborn et al. ................. | 707/2 |
| 6,321,218 B1 | 11/2001 | Guay et al. | |
| 6,466,931 B1 * | 10/2002 | Attaluri et al. ................ | 707/2 |
| 6,598,038 B1 * | 7/2003 | Guay et al. .................... | 707/2 |
| 6,772,411 B2 | 8/2004 | Hayes | |
| 6,804,627 B1 * | 10/2004 | Marokhovsky et al. ...... | 702/182 |
| 6,826,557 B1 * | 11/2004 | Carter et al. .................. | 707/2 |
| 6,834,277 B1 * | 12/2004 | Learmont .................... | 707/2 |
| 7,467,131 B1 * | 12/2008 | Gharachorloo et al. ...... | 707/3 |
| 2003/0110153 A1 | 6/2003 | Shee | |
| 2004/0210563 A1 * | 10/2004 | Zait et al. ..................... | 707/3 |
| 2005/0086246 A1 | 4/2005 | Wood et al. | |
| 2005/0149505 A1 * | 7/2005 | Bossman et al. .............. | 707/3 |
| 2006/0031189 A1 * | 2/2006 | Muras et al. .................. | 707/2 |
| 2006/0064470 A1 * | 3/2006 | Sargent et al. ............. | 709/219 |
| 2006/0173852 A1 * | 8/2006 | Bestgen et al. ............... | 707/10 |
| 2006/0212438 A1 * | 9/2006 | Ng ................................ | 707/4 |
| 2006/0230016 A1 * | 10/2006 | Cunningham et al. ......... | 707/2 |

OTHER PUBLICATIONS

S.Adali, Query Caching and Optimization in Distributed Mediator Systems, ACM, 1996, p. 137-148.*

* cited by examiner

*Primary Examiner*—Isaac M Woo
*Assistant Examiner*—Amy Ng
(74) *Attorney, Agent, or Firm*—Thomas R. Vigil (57) ABSTRACT

A method of processing information relating to the execution of instructions by a database management system includes receiving an instruction; receiving execution information relating to the execution of the instruction by the database management system; comparing the instruction to one or more previously received instructions and determining whether, according to a predetermined equivalence criterion, the instruction matches one of the previously received instructions; and, if the instruction matches a previously received instruction, combining the execution information with execution information relating to the matching one of the previously received instructions to produce aggregate execution information. The aggregate information may be used, for example, in analysing and optimizing performance characteristics of the database management system, the databases under its control, and individual instructions.

21 Claims, 3 Drawing Sheets

SYSTEM AND METHOD FOR CONSOLIDATING EXECUTION INFORMATION RELATIN TO EXECUTION OF INSTRUCTIONS BY A DATABASE MANAGEMENT SYSTEM

BACKGROUND OF THE INVENTION

1. Field of the Invention

The present invention relates to a method of and system for processing information relating to the execution of instructions by a database management system (DBMS).

2. Description of the Related Art

Database management systems manage the storage, modification and retrieval of data in a database. This involves the execution of instructions received from a variety of sources, including, for example processes executing within or externally to the database management system. For example, such an instruction may be in the form of a database query, which is used to retrieve data from a database. A database query may be in text form, typically formulated as a statement in a database query language. The database management system parses the statement, executes the query defined by the statement, and outputs the results of the query.

Databases can be large and complex, and the execution of queries can often require significant computing resources. To enable optimisation of databases and of application software interacting with those databases, database users and/or operators often require performance statistics and other information relating to the execution of database queries and other database instructions. Some database management systems therefore provide facilities for measuring the performance of the system in executing queries. However, in a complex system, where a large number of queries and other instructions are executed, the volume of performance data generated can be large, and meaningful analysis of the data is often difficult.

The present invention seeks to alleviate some of these problems.

BRIEF SUMMARY OF THE INVENTION

Accordingly, in a first aspect of the invention, there is provided a method of processing information relating to the execution of instructions by a database management system, comprising: receiving an instruction; receiving execution information relating to the execution of the instruction by the database management system; comparing the instruction to one or more previously received instructions and determining whether, according to a predetermined equivalence criterion, the instruction matches one of the previously received instructions; and, if the instruction matches a previously received instruction, combining the execution information with execution information relating to the matching one of the previously received instructions to produce aggregate execution information.

This can enable easier analysis of the execution information, as instructions may be grouped together into instruction types or classes in accordance with the equivalence criterion chosen, and aggregate execution information may be obtained for each type or class. An instruction may, for example, be a database query (for example an SQL query), a data insertion, deletion or update instruction or a data definition instruction. The term 'query' as used herein is intended to encompass any such instructions.

Execution information is preferably information describing the manner of execution of an instruction by the database management system, and typically includes one or more performance measures relating, for example, to the time taken to execute an instruction or to the number of database operations performed during execution of the instruction. The time taken to execute an instruction may be measured, for example, in terms of the elapsed time (i.e. the total time from start to completion) or in terms of processor time (i.e. the total time spent by a processor in executing the instruction). In measuring a number of database operations performed, only one or more specific types of operation may be taken into account depending on requirements. The execution information could also include lower-level information relating to performance or resource usage during execution of an instruction, such as, for example, memory or temporary disk space usage or the number of disk read/write operations performed.

Preferably, the determining step comprises placing the instruction in a standard form to produce a modified instruction, and comparing the modified instruction to the previously received instructions. Placing the instruction in a standard form preferably comprises applying one or more transformations to the instruction. If, after transformation, the instruction matches a previously received instruction, they are considered equivalent. Thus, the transformations applied define the equivalence criterion. In this way, instructions can be efficiently classified.

The method preferably comprises storing a hash table comprising hash values for one or more previously received instructions, the comparing step comprising applying a hash function to the instruction or the modified instruction to generate a hash value for the instruction or the modified instruction, and comparing the generated hash value to the hash values in the hash table. This can make the comparison step more efficient.

Preferably, the method comprises adding the hash value for the modified instruction to the hash table if it is not determined that the instruction matches a previously received instruction. In this way, new hash values representing new instruction types or classes can be added to the table so that future instructions can be compared against the new instruction type or class.

The execution information preferably comprises numerical data, and the aggregate execution information comprises one or more totals or averages of the numerical data. The execution information may, for example, comprise data relating to resource usage during execution of the instruction and/or performance data relating to the execution of the instruction. The aggregate information may be used, for example, in analysing performance characteristics of the database management system and in tuning the instruction, the database management system and/or the database(s) under its control to operate more efficiently. The method may, for example, comprise modifying an instruction and/or a database managed by the database management system in dependence on the aggregate execution information, usually with the aim of improving database performance or the efficiency of a given instruction.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

BRIEF DESCRIPTION OF THE SEVERAL VIEWS OF THE DRAWINGS

Preferred features of the present invention will now be described, purely by way of example, with reference to the accompanying drawings, in which:—

DETAILED DESCRIPTION OF THE PREFERRED EMBODIMENTS

Overview

First, a general overview of preferred embodiments of the invention will be given. Then, a more detailed description will be given of an implementation of the system in the context of a DB2 database management system.

Figure 1:
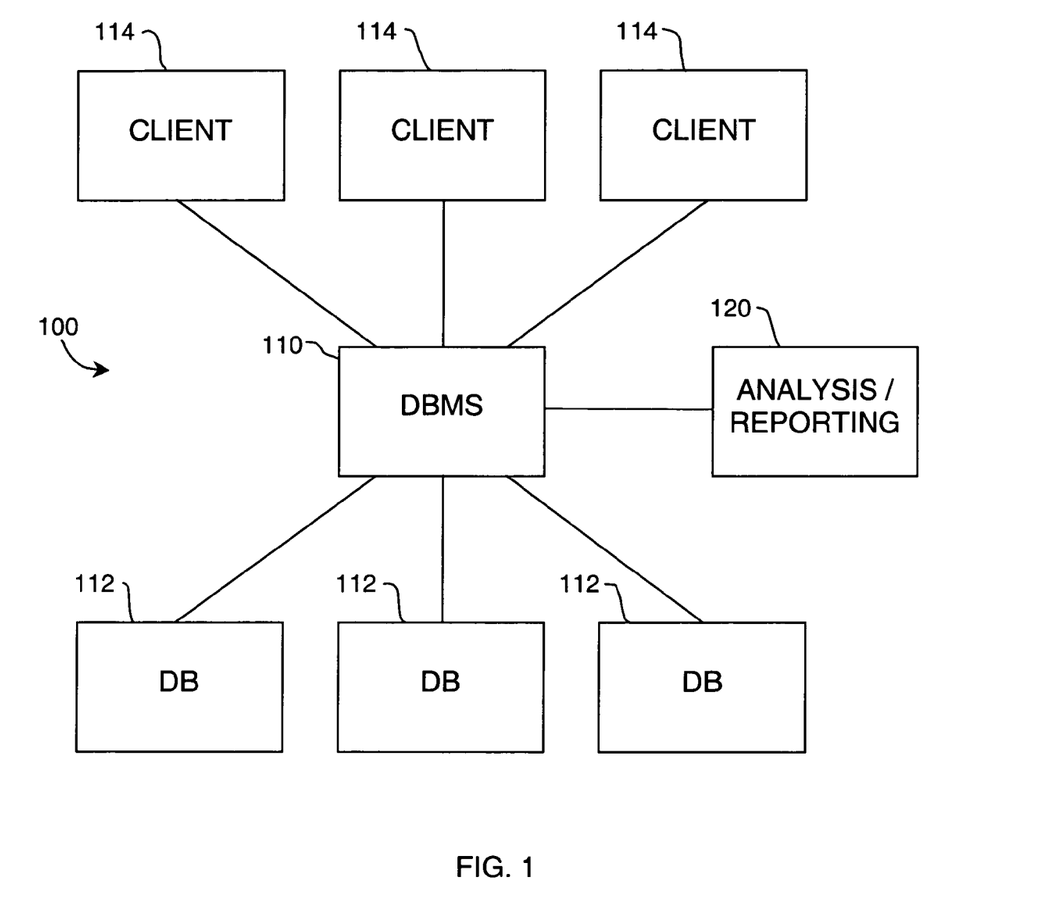
FIG. 1 is an overview of a database system.

A database system according to an embodiment of the present invention is shown in overview in FIG. 1.

The database system 100 comprises a database management system (DBMS) 110 and an analysis and reporting system 120. The database management system 110 manages one or more databases 112 and controls the storage and manipulation of data in the databases. The database management system also executes database queries received from one or more clients 114 and transmits the results of executed queries to the clients. The clients may, for example, be processes executing within or externally to the database management system, or may be remote systems connected to the database management system via a network, for example a Local Area Network (LAN) or the Internet. The database management system 110, analysis and reporting system 120, databases 112 and clients 114 may reside on a single computer (such as a database server) or on multiple connected computers.

During execution of queries, the database management system 110 gathers execution information relating to the execution of the queries. This execution information may, for example, include performance statistics, such as the time taken to execute the query, the number of database operations performed and the like. After execution of a query, the database management system transmits the query and the related execution information to the analysis and reporting system 120.

The analysis and reporting system 120 compares the received query to previously received queries, and consolidates the execution information with execution information relating to previously received queries which are considered the same as or equivalent to the query being processed, as defined by some predetermined equivalence criterion. Queries are thus in effect grouped into classes, with all queries in one class being equivalent according to the criterion. For each query class, execution information from different query executions is consolidated to produce aggregate or summary information, such as average execution times or average numbers of database operations. If a received query does not match a previously identified query class, a new class is created based on the received query.

Figure 2:
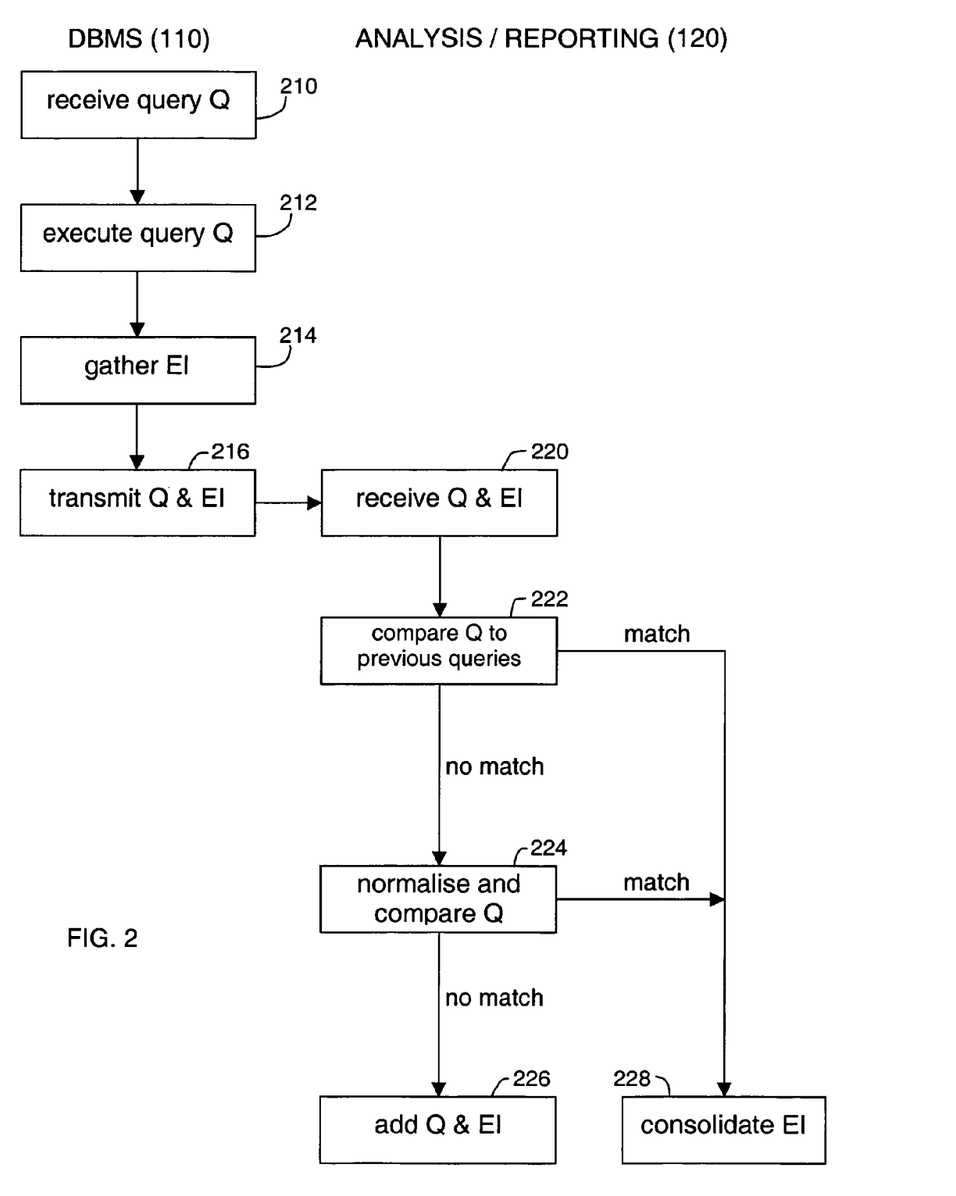
FIG. 2 illustrates a method of processing execution information.

The processing performed by the database system is illustrated in overview in FIG. 2.

In step 210, the database management system 110 receives a query (Q) from a client. The database management system executes the query (step 212) and gathers execution information (EI) (step 214), though these steps may at least partly be carried out in parallel. The query is transmitted together with the execution information to the analysis and reporting system 120 in step 216.

In step 220, the analysis and reporting system 120 receives the query and execution information and compares the query to previously received queries in step 222. If the new query matches a known class of query (as defined by previously received queries), then the execution information is associated and consolidated with previously received execution information relating to that class (step 228).

If the query does not match a known query class, then the query is modified to place it into a standard form (step 224). This step is referred to herein as normalisation of the query. The normalised query is then again compared to known query classes, and, in case of a match, consolidation of execution information occurs as previously described in step 228. If the normalised query does not match a known query class, then a new query class is created based on the newly received, normalised query in step 226, and the associated execution information is stored.

In preferred embodiments the queries are in the form of text statements or instructions. For example, the queries may be in the form of SQL statements.

Though the system could store the queries (or the normalised queries) directly in text form and could perform text comparisons between newly received and previously stored queries, this approach is likely to require significant storage and processing resources, as queries can be very large. Preferred embodiments of the present invention therefore use a more efficient solution in which a hash table is used to simplify the comparison of queries to previously received queries and the recording of the different query classes that are encountered.

In this approach, each query class is represented in the hash table by the hash value of the corresponding (normalised) query. The processing performed by the analysis and reporting server is illustrated in more detail in FIG. 3.

Figure 3:
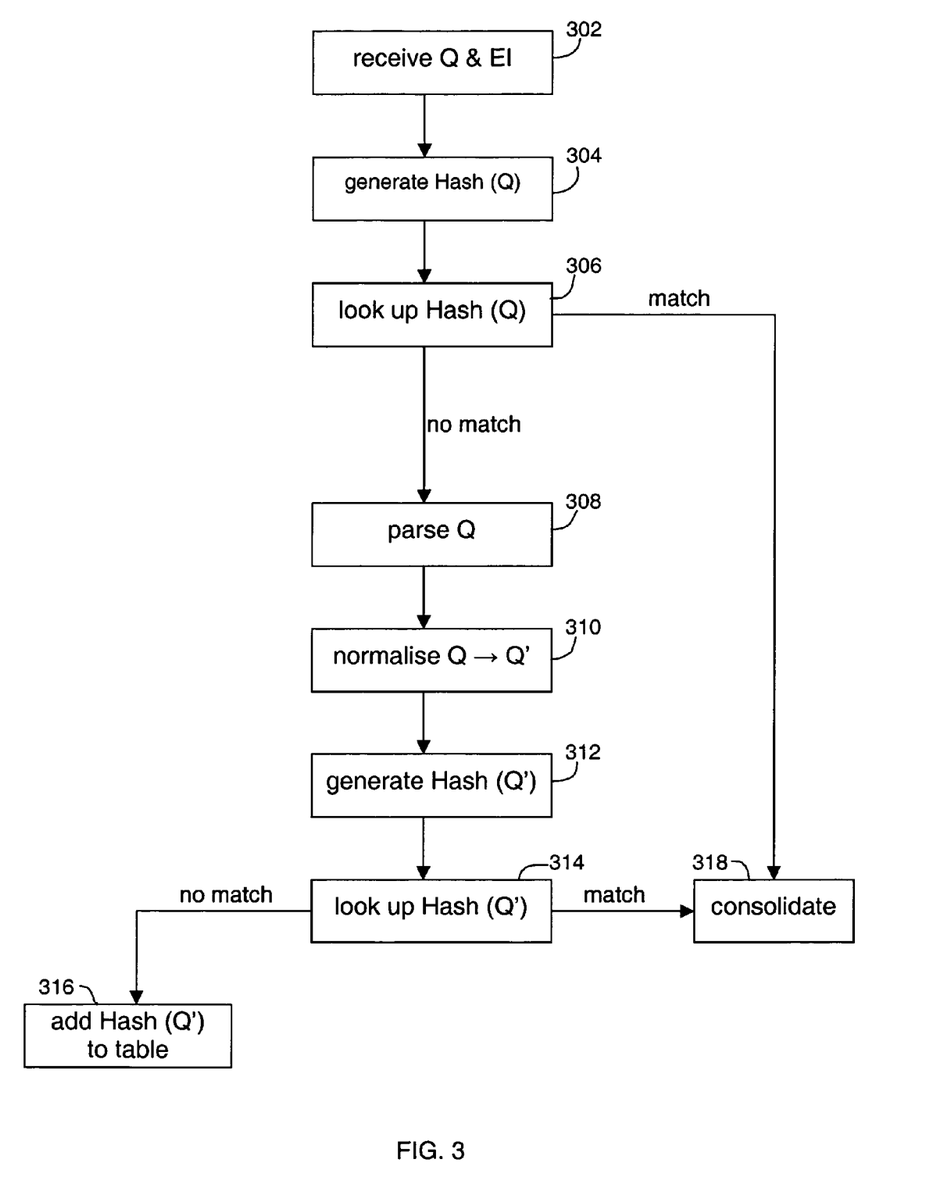
FIG. 3 illustrates the method of FIG. 2 in more detail.

The analysis and reporting system receives the query (Q, in text form), together with execution information (EI) relating to the execution of the query by the database management system, in step 302. In step 304, the system generates a hash value Hash(Q) from the query using a suitable hash function. The system then looks up the hash value Hash(Q) in the hash table at step 306. If the value Hash(Q) appears in the hash table, query Q is considered to match a previously identified query class represented by that hash value. The execution information EI is then consolidated with other execution information stored in the system for that query class (step 318).

If no match is found in the hash table, then query Q is parsed (step 308) to identify its constituent elements and normalised (step 310) to place it in a standard format. This involves, for example, reordering certain elements and replacing certain elements which are not considered to distinguish between query classes with placeholders. A normalised query Q' is then generated in text form (for example as an SQL statement). The system then calculates a new hash value Hash(Q') from the normalised query Q' in step 312 and looks up the new hash value Hash(Q') in the hash table (step 314). Once again, if a match is found, then query Q is considered to match a previously identified query class, and its associated execution information is consolidated with other information of that class in step 318. If after normalisation no match is found, then a new entry is added to the hash table in step 316. This new entry is the hash value Hash(Q') of the normalised version of query Q and represents a new query class. The execution information EI is stored, enabling consolidation with future queries of the same class.

The two-stage process described above, in which the query is first checked against the hash table in the form in which it is received, before normalisation is performed if required, can enable the relatively processing-intensive normalisation step to be avoided for some queries. By comparison, the hashing step itself is usually a relatively fast operation.

The details of the query normalisation process define which queries will be considered equivalent, and hence define an equivalence criterion used by the system to group queries into query classes. In preferred embodiments, the normalisation process, and hence the equivalence criterion, is customisable by users of the system to allow the way in which execution information is consolidated to be adjusted in dependence on reporting requirements, thus providing greater flexibility.

Though in the above example each query is transmitted to the analysis and reporting system together with its associated execution information immediately after execution of the query, information may alternatively be collected over a defined period of time and processed in bulk.

Consolidation of execution information may, for example, include calculation of totals or averages for given performance measures. These may be calculated on-the-fly as data is received or later, for example at the reporting stage. The consolidation process may simply store the execution information for each of the received queries in a way which maintains the association between queries of the same query class, allowing the data itself to be processed at a later point.

The consolidated execution information is made available to users of the system for reporting purposes. Preferably, the system stores other information relating to queries, such as data identifying the client originating the query, a transaction or other unit of processing during which the query was originated, or other information which allows queries to be categorised in some way. The analysis and reporting system may then provide facilities for organising the execution information according to the categorisation information, for example to enable the reporting of performance statistics for a given client, or for a given query class within that client, or for a given query class across all clients.

The aggregate execution information may be used, for example, in analysing and optimizing performance characteristics of the database management system, the databases under its control, and individual instructions.

DETAILED EXAMPLE

Aspects of the system which has been described above in general terms will now be described in more detail in the context of a specific implementation example. In this example, the database management system 110 of FIG. 1 is an IBM DB2 system, in which queries are expressed in the form of SQL statements. The following description uses known DB2 terminology and includes references to standard DB2 features, documented in more detail in available DB2 documentation.

SQL query text together with related execution information is collected from the host DB2 system using the DB2 Instrumentation Facility. The DB2 Instrumentation Facility is a standard DB2 feature that is available in all DB2 installations. It collects various data from the active DB2 system relating to its operation. The SQL query text and execution information is provided as input to the consolidation process described above. Specifically, because the consolidation process does not distinguish between the source of SQL statements, identical SQL statements originating from different places within a program or from different programs within the DB2 system are considered equivalent. Furthermore, SQL statements which differ in various defined ways are also considered equivalent, for example where statements differ only in having:

different literal values
different host variables
a different combination of literals and host variables
different spacing between tokens
the FROM list in a different order
the SELECT list in a different order
the PREDICATES specified in a different order.
different correlation-names for the table names in the FROM clause
different methods of qualifying objects such that the resulting fully qualified objects are the same or equivalent
logically equivalent operators or combinations of operators in predicates
logically equivalent CASE structures
different but equivalent expressions The above list is not necessarily comprehensive, and other ways in which different statements could reasonably be considered as equivalent may be used in determining equivalence.

Equivalence is determined by way of the normalisation process. Each item in the above list specifies a way in which different SQL queries can be grouped into query classes for consolidation. The different consolidation methods are individually selectable at the time the consolidation process is executed so that different reporting and other requirements can be met.

The consolidated query information is then presented to the user in a way that allows the user to view various levels of data from a top-level summary report down to low-level detail reports.

Data Collection

As mentioned, the system uses certain features of the DB2 Instrumentation Facility to collect execution information relating to SQL queries issued against any databases accessible to the DB2 system. The DB2 Instrumentation Facility collects execution information for an SQL query as the query is executed.

In this implementation example, execution information is collected by starting a DB2 Instrumentation Facility Performance Trace for selected IFCIDs (Instrumentation Facility Component Identifiers) and, optionally, a DB2 Monitor trace.

The performance trace provides information about a variety of DB2 events which occur during execution of SQL statements, including events related to distributed data processing. The information gathered by the Instrumentation Facility is categorised by IFCIDs. The information can be used to identify suspected problems, or to tune DB2 programs and resources for individual users or for the DB2 system as a whole. In the present example, performance trace Class 32 is used, which allows user specification of the required IFCIDs. A monitor trace can be used to record other types of information if required.

The data can be collected for a fixed pre-determined period of time or can be collected continuously. The data is available for consolidation and reporting at the end of the collection period or can also be made available at specified intervals during on-going data collection.

In the present example, a performance trace is executed which collects the following IFCIDs, identifying the originating Application Plan, Program, Statement Number, Authorization ID (also referred to herein as 'AUTHID') and Cursor name, where applicable:

65 Open Cursor (records the start of the execution of an open cursor for static or dynamic SQL)

59 Fetch Row for Cursor (records the start of the execution of a "fetch" SQL statement)

66 Close Cursor (records the start of the execution of a close cursor for static or dynamic SQL)

60 Select (records the start of the execution of an SQL select statement)

61 Insert/Update/Delete (records the start of the execution of an insert, update, or delete SQL statement)

64 Prepare (records the start of the execution of a "prepare" SQL statement)

63 SQL Text (records the SQL statement to be parsed)

58 End of SQL Statistics (records the end of the SQL statement execution that had its start recorded by IFCID 59 through 66)

74 Beginning of Terminate Thread (records the start of the terminate thread request)

163 Serving Agent Data (records serving agent data)

221 Degree of Parallel Processing (records information about the degree of parallel processing for a parallel group)

222 Elapsed time of Parallel group (records information about the elapsed time of a parallel group)

232 Parallel Group completion (records the completion of a parallel group)

The above list of IFCIDs is merely intended as an example and is not comprehensive. A different or enhanced set of IFCIDs may be collected depending on requirements, for example if a more detailed analysis of performance characteristics is required.

The IFCID 58 contains the information related to performance statistics and is tied back to the initial IFCID 59-61, 64-66 to identify the SQL event that incurred the relevant performance costs. The total fetches per Cursor and the total CPU usage, elapsed times and row statistics are accumulated for each SQL query.

To enable a more focused analysis the process accepts parameters to limit the trace to one or more specific Plans, Programs, Authorization IDs or Databases and to specific time periods.

Consolidation Process

1. SQL Query Text Comparison.

In order to be able to determine whether a given SQL query is the same or equivalent to an SQL query seen previously, a system of hashing the SQL query text is employed. The SQL query text can be very large—in some examples it can be up to 2 MB in size—so it is typically not feasible to carry out a character-by-character comparison of the incoming text against each SQL query text that has been previously received. Hash values of queries are therefore used in place of the queries themselves.

Specifically, for each query, a hash value of the SQL query text is generated using a hash function. Any of a variety of known hash functions can be used, though a hash function with a low collision rate is preferred. The collision rate is defined as the rate of occurrence of two different SQL queries resulting in the same hash value. Such an occurrence would of course lead to SQL queries which do not meet the required equivalence criterion being grouped within the same query class, leading to incorrect consolidation of query data.

Purely by way of example, one of the following hash functions may be suitable: MD5, FNV, CRC, though others are available. Typically a hash function divides the source text into one- or two-byte segments, performs an operation on the numeric representation of each segment in turn, and combines the result into a running total in some way. Once all the segments have been processed, the final value of the running total is assigned as the hash value. In a preferred embodiment, a hash function producing a 16 byte hash value is used.

The hash value is then used to access a keyed array where the hash value is used as the key of the array. If the key (that is, the hash value) for a given query already exists in the table, then the query is considered to match a previously seen SQL query.

2. Pre-Normalisation Test.

For static SQL, the SQL query text is first retrieved from the DB2 Catalogue.

The SQL query text is first checked in the exact form in which it was collected by the DB2 trace, i.e. without any formatting or other processing being done.

The SQL text is hashed to produce a unique 16 byte hash value as previously described. This is then checked against the array of previously encountered hash values (the hash table).

3. Normalisation.

If the pre-normalisation test did not produce a match, then the SQL query text is normalised to eliminate various non-significant features and place the text into a standard form. As mentioned, the way in which the SQL query text is normalized affects whether or not particular SQL queries are grouped under a single query class and consolidated. The normalization is controlled by a series of user-selectable controls.

First the query text is parsed to split it up into individual tokens. Various delimiters within the SQL query text identify the start and end of each token. These delimiters may also appear in various combinations with each other. The delimiters used are typically: the space character, the string delimiter character, the escape character, "(",")", ",", ".", "=", "<", ">", "¬", "|", "*", "+", "/", ":", ";".

The following types of tokens are identified as relevant to the normalisation process. They are identified by the context in which they appear within the SQL text:

Host variables, Numeric literals, Non-numeric literals

Table names listed in the FROM list

Columns and sub-queries in the SELECT list

Predicates specified after WHERE

Correlation names

ORDER BY, GROUP BY, HAVING

UNION (including variants), JOIN clause (in all forms)

CAST constructs

Comparison operands

Function names

IN lists

WITH

Other types of tokens may also be used as appropriate.

Tables, columns and predicates are broken down into their component parts, i.e. qualifier, table or view name, column name and correlation name.

The query is then reproduced in a normalized form, in which tokens which are references to host variables are replaced by a '?' character as a placeholder. Tokens which are literals, numeric or non-numeric, are replaced by the '!' character, or by '?' if literals and host variables are to be treated as equivalent. This is preferably a user-selectable option. Depending on further user-selectable options, the following changes are made in the normalised SQL query text:

- Tables in the FROM list are sorted.
- Columns and sub-queries are sorted.
- WHERE predicates are sorted.
- Logically equivalent variations in predicate operands are standardized; for example, '¬=' becomes '< >', '¬>' becomes '<=', '¬<' becomes '>=', '!=' becomes '< >', '!>' becomes '<=', and '!<' becomes '>='.
- Logically similar variations in CASE constructs are standardized; for example, the following are equivalent:
  - CASE WHEN X=Y THEN 0 ELSE 1 END
  - CASE WHEN X<>Y THEN 1 ELSE 0 END
- Function names are standardized, as in these examples:
  - LCASE and LOWER are the same
  - CONCAT and '||' are functionally the same.
- Equivalent expressions are standardized, for example, A*B is equivalent to B*A.
- IN lists of different lengths are standardized to the same length.

Qualifiers may also be standardized. This involves altering some or all of the following so that differences in the method of qualification are eliminated where the qualified objects are the same or equivalent:
- column qualifiers
- table qualifiers
- correlation name Qualifiers may be specified in the SQL query text where fully-qualified object names have been included in the query, or may be assumed following standard DB2 rules. If qualifiers are assumed, then they will be added to suitably unqualified objects. Mechanisms are invoked to retrieve the correct qualifier by following the appropriate DB2 rules. The qualifier can be:
- Retrieved from the DB2 Catalogue
- Specified earlier in the trace using the SET CURRENT SQLID command
- Assumed from the currently active AUTHID The system then generates modified SQL query text, eliminating all unnecessary spaces between tokens.

The normalised SQL query text is again hashed to produce a new hash value which is compared to the hash table—if a match is found, then the query is considered to match the known query class represented by that hash value.

If no match is found, then a new entry is stored in the hash table using the generated hash value.

Consolidation of Execution Information

Where there is a match between a query and the hash table the query is assumed to be the same as or equivalent to the previous query from which the relevant hash table entry was originally produced, and so the two queries and their respective execution information are consolidated. Specifically, the following execution information is consolidated:
- Statement frequency
- CPU time
- Elapsed time
- Fetch CPU
- Fetch elapsed time
- Fetch count
- Rows processed
- DM stage-1 requests
- RDS stage-2 requests
- Rows updated
- Getpage requests Additionally, the following data is collected:
- Total SQL events
- Number of SQL queries consolidated
- Total trace time
- Sub-totals summarising execution information by:
  - Programs,
  - SQL query classes within Programs
  - Plans
  - Programs within Plans
  - Collections
  - Programs within Collections
  - AUTHIDs
  - SQL query classes within AUTHIDs
  - SQL query classes
  - DBnames
  - Tables within DBnames
  - Tables
  - SQL query classes within tables
- Access path data from the BIND plan table
- Access path data obtained by explaining the SQL statement Average, maximum & minimum values are also computed where appropriate.

The above are examples of the types of execution information that may be collected and made available. Depending on the context, not all of the above information may be required. Also, other types of information may be collected instead of or in addition to the types mentioned above.

Reporting

The consolidated execution information for the identified SQL query classes is presented to the user in a way that allows the user to view various levels of summary/detail information, from a top-level summary report down to low-level detail reports.

Specifically, in a preferred example, the available data is organised and grouped by Workload (which may include information from multiple performance traces), and within Workload, by Trace (providing data for an individual trace). Optionally a further Interval sub-grouping may be provided within the Trace grouping, which represents a subset of the data for a given trace covering a specified time period.

Reporting is organised so that initially the user is presented with a summary of the activity within a workload. The user can then select a category to display a more detailed view of execution information for the selected category. For example, this category may be Trace if the user decides to view data just pertaining to a single trace or some other category such as Program, AUTHID, and so on. This more detailed view may, in turn, present further opportunities to obtain ever more detailed views of the execution information until the user reaches a bottom-level view of details for an individual SQL query class.

Examples of Consolidated SQL Queries

The following SQL queries would be considered equivalent and would be consolidated:

```
SELECT CUS.NAME,
    CUS.ADDR_LINE_1,
    CUS.ADDR_LINE_2,
    XOP_ORDER.CUST_NUM,
    XOP_ORDER.PRODUCT_NUM,
    XOP_ORDER.QUANTITY * PRO.PRICE AS SPEND
FROM SXQA6101.XOP_CUSTOMER CUS,
    SXQA6101.XOP_PRODUCT PRO,
    SXQA6101.XOP_ORDER
WHERE CUS.NAME = 'Alex Batten'
    AND CUS.CUST_NUM = XOP_ORDER.CUST_NUM
    AND CUS.CUST_NUM ¬> 10000
    AND XOP_ORDER.PRODUCT_NUM =
        PRO.PRODUCT_NUM
    AND XOP_ORDER.PRODUCT_NUM IN (1, 3, 7, 23)
ORDER BY XOP_ORDER.CUST_NUM,
    XOP_ORDER.PRODUCT_NUM
SET CURRENT SQLID = 'SXQA6101';
SELECT CUST.NAME,
    CUST.ADDR_LINE_1,
    CUST.ADDR_LINE_2,
    ORD.PRODUCT_NUM,
    ORD.CUST_NUM,
    PRO.PRICE * ORD.QUANTITY AS SPEND
FROM XOP_CUSTOMER CUST,
    XOP_ORDER ORD
    XOP_PRODUCT PRO,
WHERE CUST.NAME = ?
    AND ORD.PRODUCT_NUM = PRO.PRODUCT_NUM
    AND CUST.CUST_NUM <= 10000
    AND ORD.PRODUCT_NUM IN (1, 3, 7, 21, 55, 48)
    AND CUST.CUST_NUM = ORD.CUST_NUM
ORDER BY ORD.CUST_NUM, ORD.PRODUCT_NUM
```

The following SQL queries would be considered equivalent and would be consolidated:

```
UPDATE XOP_ORDER A
    SET QUANTITY = (QUANTITY + 8)
    WHERE A.CUST_NUM IN
        (SELECT B.CUST_NUM
        FROM XOP_CUSTOMER B
        WHERE B.POSTCODE LIKE '%DE%')
        AND A.PRODUCT_NUM NOT BETWEEN 10 AND 330
UPDATE XOP_ORDER ORD
    SET QUANTITY = (8 + QUANTITY)
    WHERE (ORD.PRODUCT_NUM < 10
        OR ORD.PRODUCT_NUM > 330)
        AND ORD.CUST_NUM IN
            (SELECT CUS.CUST_NUM
            FROM XOP_CUSTOMER CUS
            WHERE CUS.POSTCODE LIKE '%DE%')
```

The following SQL queries would be considered equivalent and would be consolidated:

```
SELECT A.CUST_NUM,
    DATE,
    A.PRODUCT_NUM,
    A.QUANTITY
FROM XOP_ORDER A
JOIN
    (SELECT B.CUST_NUM,
        MAX(B.DATE) AS MAXDATE
    FROM XOP_ORDER B
    GROUP BY B.CUST_NUM) AS C
ON A.CUST_NUM = C.CUST_NUM
    AND A.DATE = MAXDATE
ORDER BY A.CUST_NUM, A.PRODUCT_NUM
SELECT A.CUST_NUM,
    A.PRODUCT_NUM,
    DATE,
    A.QUANTITY
FROM XOP_ORDER A
JOIN
    (SELECT B.CUST_NUM,
        MAX(B.DATE) AS MAXIMUMDTE
    FROM XOP_ORDER B
    GROUP BY B.CUST_NUM) AS C
ON C.CUST_NUM = A.CUST_NUM
    AND A.DATE = MAXIMUMDTE
ORDER BY A.CUST_NUM, A.PRODUCT_NUM
```

It will be understood that the present invention has been described above purely by way of example, and modification of detail can be made within the scope of the invention.

For example, though in the above examples, queries are in text form (for example as SQL text), queries may also be encoded in a different representation, for example as a data structure.

Instead of using a hash function, the query text could be converted into some other simplified representation and stored in that form. Comparisons between queries could then use the simplified representation.

In addition to queries used to retrieve data from a database, the present system can be applied to other types of database instructions or statements, such as insert, update and delete statements and data definition statements. The term query as used herein is intended to encompass any such other types of statements and instructions.

The aggregate execution information produced by the system can be used in analysing performance characteristics of the database management system and/or the database(s) under its control and for diagnosing performance issues. Furthermore, the information can be used as input to a (manual or automatic) tuning process for tuning the database management system and/or the database(s) under its control to operate more efficiently.

What is claimed is:

1. A method of processing information relating to the execution of instructions by a database management system, wherein the method is performed by a data processing apparatus and comprises:

receiving an instruction;

receiving execution information relating to the execution performance of the instruction when executed by the database management system;

comparing the instruction to one or more previously received instructions and determining whether, according to a user selectable equivalence criterion, the instruction matches one of the previously received instructions; and if the instruction matches a previously received instruction, combining the execution information with execution information relating to the matching one of the previously received instructions to produce aggregate execution information;

wherein the aggregate execution information comprises a plurality of aggregate values each representing a respective performance measure, the aggregate values determined for a plurality of executions of instructions determined as equivalent according to the user selectable equivalence criterion, the plurality of aggregate values including at least one of: a sum value, an average value, a minimum value, and a maximum value;

wherein the method further comprises storing a hash table comprising hash values for one or more previously received instructions;

and wherein the comparing and determining step comprises:

applying a hash function to the received instruction to generate a hash value for the received instruction, and comparing the generated hash value to the hash values in the hash table;

responsive to a determination that the generated hash value does not match match one of the hash values in the hash table, placing the received instruction in a standard form to produce a modified instruction, applying a hash function to the modified instruction to generate a hash value for the modified instruction, and comparing the hash value for the modified instruction to the hash values in the hash table; and determining that the received instruction matches a previously received instruction responsive to a determination that either the hash value for the received instruction or the hash value for the modified instruction matches a hash value in the hash table.

2. A method according to claim 1, wherein the execution information comprises numerical data, and wherein the aggregate execution information comprises one or more totals or averages of the numerical data.

3. A method according to claim 1, wherein the execution information comprises performance data including at least one of: data relating to resource usage during execution of the instruction; data relating to a number of database operations performed; and data relating to the execution time of the instruction.

4. A method according to claim 1, further comprising modifying an instruction or a database managed by the database management system in dependence on the aggregate execution information.

5. A method according to claim 1, wherein the instruction is a database query and the previously received instructions are previously received database queries.

6. A method according to claim 1, wherein the instruction is an SQL statement or query, and the previously received instructions are previously received SQL statements or queries.

7. A method of processing information relating to the execution of instructions by a database management system, wherein the method is performed by a data processing apparatus and comprises:

receiving a user selection of one or more transformations, the user-selected transformations being selected from a set of predefined transformations;

storing a hash table comprising hash values for one or more previously received instructions;

receiving an instruction;

receiving execution information relating to the execution performance of the instruction when executed by the database management system;

comparing the instruction to one or more previously received instructions and determining whether, according to a predetermined equivalence criterion, the instruction matches one of the previously received instructions, the comparing and determining step comprising:

applying a hash function to the received instruction to generate a hash value for the received instruction, and comparing the generated hash value to the hash values in the hash table;

responsive to a determination that the generated hash value does not match one of the hash values in the hash table, placing the received instruction in a standard form to produce a modified instruction, applying a hash function to the modified instruction to generate a hash value for the modified instruction, and comparing the hash value for the modified instruction to the hash values in the hash table; and determining that the received instruction matches a previously received instruction responsive to a determination that either the hash value for the received instruction or the hash value for the modified instruction matches a hash value in the hash table;

if the instruction matches a previously received instruction, combining the execution information with execution information relating to the matching one of the previously received instructions to produce aggregate execution information, and wherein placing the instruction in a standard form comprises applying the one or more user-selected transformations to the instruction.

8. A method according to claim 7, wherein placing the instruction in a standard form comprises reordering elements of the instruction into a predetermined order.

9. A method according to claim 7, wherein placing the instruction in a standard form comprises deleting one or more elements of the instruction.

10. A method according to claim 7, wherein placing the instruction in a standard form comprises replacing one or more elements of the instruction with placeholders.

11. A method according to claim 7, wherein the set of predefined transformations includes at least one of: standardizing function names; standardizing equivalent expressions; standardizing qualifiers for qualifying database objects; standardizing logically similar CASE constructs; replacing variable references in the instruction with a first placeholder and literals with a second placeholder different from the first placeholder.

12. A method of processing information relating to the execution of instructions by a database management system, wherein the method is performed by a data processing apparatus and comprises:

receiving an instruction;

receiving execution information relating to the execution performance of the instruction when executed by the database management system;

storing a hash table comprising hash values for one or more previously received instructions;

comparing the received instruction to one or more previously received instructions and determining whether, according to a predetermined equivalence criterion, the instruction matches one of the previously received instructions; the comparing and determining step comprising:

applying a hash function to the received instruction to generate a hash value for the received instruction, and comparing the generated hash value to the hash values in the hash table;

responsive to a determination that the generated hash value does not match match one of the hash values in the hash table, placing the received instruction in a standard form to produce a modified instruction, applying a hash function to the modified instruction to generate a hash value for the modified instruction, and comparing the hash value for the modified instruction to the hash values in the hash table; and determining that the received instruction matches a previously received instruction responsive to a determination that either the hash value for the received instruction or the hash value for the modified instruction matches a hash value in the hash table;

the method further comprising:

in response to determining that the received instruction matches a previously received instruction, combining the execution information with execution information relating to the matching one of the previously received instructions to produce aggregate execution information.

13. A method according to claim 12, comprising, when it is not determined that the instruction matches a previously received instruction, adding the hash value for the modified instruction to the hash table.

14. A computer program product for processing information relating to the execution of instructions by a database management system, comprising a computer-readable medium having stored thereon software code adapted, when executed on a data processing apparatus, to perform the steps of:

receiving an instruction;

receiving execution information relating to the execution performance of the instruction when executed by the database management system;

comparing the instruction to one or more previously received instructions and determining whether, according to a user selectable equivalence criterion, the instruction matches one of the previously received instructions; and if the instruction matches a previously received instruction, combining the execution execution information with execution information relating to the matching one of the previously received instructions to produce aggregate execution information;

wherein the aggregate execution information comprises a plurality of aggregate values each representing a respective performance measure, the aggregate values determined for a plurality of executions of instructions determined as equivalent according to the user selectable equivalence criterion, the plurality of aggregate values including at least one of: a sum value, an average value, a minimum value, and a maximum value;

the software code further being adapted to perform the step of storing a hash table comprising hash values for one or more previously received instructions;

and wherein the comparing and determining step comprises:

applying a hash function to the received instruction to generate a hash value for the received instruction, and comparing the generated hash value to the hash values in the hash table;

responsive to a determination that the generated hash value does not match one of the hash values in the hash table, placing the received instruction in a standard form to produce a modified instruction, applying a hash function to the modified instruction to generate a hash value for the modified instruction, and comparing the hash value for the modified instruction to the hash values in the hash table; and determining that the received instruction matches a previously received instruction responsive to a determination that either the hash value for the received instruction or the hash value for the modified instruction matches a hash value in the hash table.

15. A computer program product for processing information relating to the execution of instructions by a database management system, comprising a computer-readable medium having stored thereon software code adapted, when executed on a data processing apparatus, to perform the steps of:

receiving a user selection of one or more transformations, the user-selected transformations being selected from a set of predefined transformations;

storing a hash table comprising hash values for one or more previously received instructions;

receiving an instruction;

receiving execution information relating to the execution performance of the instruction when executed by the database management system;

comparing the instruction to one or more previously received instructions and determining whether, according to a predetermined equivalence criterion, the instruction matches one of the previously received instructions, the comparing and determining step comprising:

applying a hash function to the received instruction to generate a hash value for the received instruction, and comparing the generated hash value to the hash values in the hash table;

responsive to a determination that the generated hash value does not match one of the hash values, in the hash table, placing the received instruction in a standard form to produce a modified instruction, applying a hash function to the modified instruction to generate a hash value for the modified instruction, and comparing the hash value for the modified instruction to the hash values in the hash table; and determining that the received instruction matches a previously received instruction responsive to a determination that either the hash value for the received instruction or the hash value for the modified instruction matches a hash value in the hash table;

if the instruction matches a previously received instruction, combining the execution information with execution information relating to the matching one of the previously received instructions to produce aggregate execution information, and wherein placing the instruction in a standard form comprises applying the one or more user-selected transformations to the instruction.

16. A computer program product for processing information relating to the execution of instructions by a database management system, comprising a computer-readable medium having stored thereon software code adapted, when executed on a data processing apparatus, to perform the steps of:

receiving an instruction;

receiving execution information relating to the execution performance of the instruction when executed by the database management system;

storing a hash table comprising hash values for one or more previously received instructions;

comparing the received instruction to one or more previously received instructions and determining whether, according to a predetermined equivalence criterion, the instruction matches one of the previously received instructions; the comparing and determining step comprising:

applying a hash function to the received instruction to generate a hash value for the received instruction, and comparing the generated hash value to the hash values in the hash table;

responsive to a determination that the generated hash value does not match one of the hash values in the hash table, placing the received instruction in a standard form to produce a modified instruction, applying a hash function to the modified instruction to generate a hash value for the modified instruction, and comparing the hash value for the modified instruction to the hash values in the hash table; and determining that the received instruction matches a previously received instruction responsive to a determination that either the hash value for the received instruction or the hash value for the modified instruction matches a hash value in the hash table;

the software code being further adapted to perform the step of:

in response to determining that the received instruction matches a previously received instruction, combining the execution information with execution information relating to the matching one of the previously received instructions to produce aggregate execution information.

17. A method of processing information relating to the execution of instructions by a database management system, wherein the method is performed by a data processing apparatus and comprises:

receiving an instruction;

receiving execution information relating to the execution performance of the instruction when executed by the database management system;

comparing the instruction to one or more previously received instructions and determining whether, according to a predetermined equivalence criterion, the instruction matches one of the previously received instructions;

if the instruction matches a previously received instruction, combining the execution information with execution information relating to the matching one of the previously received instructions to produce aggregate execution information;

providing aggregate execution information relating to received instructions to a reporting component for analysis and reporting of the information; and presenting, by the reporting component, the aggregate execution information to a user in accordance with at least one user-selectable grouping, wherein the grouping is selected from a plurality of groupings including at least one of: a grouping by workload, a grouping by trace, and a grouping by time period;

wherein the method further comprises storing a hash table comprising hash values for one or more previously received instructions;

and wherein the comparing and determining step comprises:

applying a hash function to the received instruction to generate a hash value for the received instruction, and comparing the generated hash value to the hash values in the hash table;

responsive to a determination that the generated has value does of match one of the hash values in the hash table, placing the received instruction in a standard form to produce a modified instruction, applying a hash function to the modified instruction to generate a hash value for the modified instruction, and comparing the hash value for the modified instruction to the hash values in the hash table; and determining that the received instruction matches a previously received instruction responsive to a determination that either the hash value for the received instruction or the hash value for the modified instruction matches a hash value in the hash table.

18. An analysis and reporting system for analysing and reporting execution information relating to the execution of instructions by a database management system, comprising a processor and associated memory configured to execute software, the software including a consolidation component arranged to:

receive execution information relating to the execution performance of instructions executed by the database management system;

for a given instruction, compare the instruction to one or more previously received instructions and determine whether, according to a predetermined equivalence criterion, the instruction matches one of the previously received instructions; and if the instruction matches a previously received instruction, combine the execution information with execution information relating to the matching one of the previously received instructions to produce aggregate execution information;

the software further comprising an analysis and reporting component for analysis and reporting of aggregate execution information relating to a plurality of instructions executed by the database management system, wherein the analysis and reporting component is arranged to summarise the aggregate execution information in accordance with at least one user-selectable grouping, wherein the grouping is selected from a plurality of groupings including at least one of: a grouping by workload, a grouping by trace, and a grouping by time period;

wherein the consolidation component is further configured to:

store a hash table comprising hash values for one or more previously received instructions;

apply a hash function to the received instruction to generate a hash value for the received instruction, and compare the generated hash value to the hash values in the hash table;

responsive to a determination that the generated hash value does not match one of the hash values in the hash table, place the received instruction in a standard form to produce a modified instruction, apply a hash function to the modified instruction to generate a hash value for the modified instruction, and compare the hash value for the modified instruction to the hash values in the hash table; and determine that the received instruction matches a previously received instruction responsive to a determination that either the hash value for the received instruction or the hash value for the modified instruction matches a hash value in the hash table.

19. A method of processing information relating to the execution of instructions by a database management system, wherein the method is performed by a data processing apparatus and comprises:

executing a trace to gather execution information relating to the execution performance of instructions executed by the database management system;

consolidating execution information relating to equivalent instructions by a process including:

for a given instruction, comparing the instruction to one or more previously received instructions and determining whether, according to a predetermined equivalence criterion, the instruction matches one of the previously received instructions; and if the instruction matches a previously received instruction, consolidating the execution information with execution information relating to the matching one of the previously received instructions to produce consolidated execution information;

wherein the execution information gathered by the trace is selected in accordance with at least one parameter;

wherein the method further comprises storing a hash table comprising hash values for one or more previously received instructions;

and wherein the comparing and determining step comprises:

applying a hash function to the given instruction to generate a hash value for the given instruction, and comparing the generated hash value to the hash values in the hash table;

responsive to a determination that the generated hash value does not match one of the hash values in the hash table, placing the given instruction in a standard form to produce a modified instruction, applying a hash function to the modified instruction to generate a hash value for the modified instruction, and comparing the hash value for the modified instruction to the hash values in the hash table; and determining that the given instruction matches a previously received instruction responsive to a determination that either the hash value for the given instruction or the hash value for the modified instruction matches a hash value in the hash table.

20. A method according to claim 19, wherein the at least one parameter specifies at least one of: a plan, a program, an authorization ID, a database, and a time period in relation to which execution information is to be gathered.

21. A computer program product for processing information relating to the execution of instructions by a database management system, comprising a computer-readable medium having stored thereon software code adapted, when executed on a data processing apparatus, to perform the steps of:

executing a trace to gather execution information relating to the execution performance of instructions executed by the database management system;

consolidating execution information relating to equivalent instructions by a process including:

for a given instruction, comparing the instruction to one or more previously received instructions and determining whether, according to a predetermined equivalence criterion, the instruction matches one of the previously received instructions; and if the instruction matches a previously received instruction, consolidating the execution information with execution information relating to the matching one of the previously received instructions to produce consolidated execution information;

wherein the execution information gathered by the trace is selected in accordance with at least one parameter;

the software code being further adapted to perform the step of storing a hash table comprising hash values for one or more previously received instructions;

and wherein the comparing and determining step comprises:

applying a hash function to the given instruction to generate a hash value for the given instruction, and comparing the generated hash value to the hash values in the hash table;

responsive to a determination that the generated hash value does not match one of the hash values in the hash table, placing the given instruction in a standard form to produce a modified instruction, applying a hash function to the modified instruction to generate a hash value for the modified instruction, and comparing the hash value for the modified instruction to the hash values in the hash table; and determining that the given instruction matches a previously received instruction responsive to a determination that either the hash value for the given instruction or the hash value for the modified instruction matches a hash value in the hash table.

* * * * *

UNITED STATES PATENT AND TRADEMARK OFFICE
CERTIFICATE OF CORRECTION

PATENT NO. : 7,877,378 B2  
APPLICATION NO. : 11/117281  
DATED : January 25, 2011  
INVENTOR(S) : Jon Gray Page 1 of 1

It is certified that error appears in the above-identified patent and that said Letters Patent is hereby corrected as shown below:

Please correct the Title of the Invention on the Title Page and Col. 1, lines 1-5 from:

"(54) SYSTEM AND METHOD FOR CONSOLIDATING EXECUTION INFORMATION RELATIN TO EXECUTION OF INSTRUMENTS BY A DATABASE MANAGEMENT SYSTEM"

To: --(54) SYSTEM AND METHOD FOR CONSOLIDATING EXECUTION INFORMATION RELATING TO EXECUTION OF INSTRUMENTS BY A DATABASE MANAGEMENT SYSTEM-- and Add in Assignee on Title Page:

--(73) Assignee: Cogito Limited, East Sussex, United Kingdom (UK)--

Signed and Sealed this

Thirteenth Day of December, 2011

David J. Kappos  
*Director of the United States Patent and Trademark Office*